Patented June 19, 1951

2,557,189

UNITED STATES PATENT OFFICE 2,557,189

COPOLYMERS OF UNSATURATED ESTERS

Ernest Paul Irany, Cranford, and Irving Skeist, Newark, N. J., and Vincent F. Maturi, New York, N. Y., assignors to Celanese Corporation of America, a corporation of Delaware No Drawing. Application January 10, 1947, Serial No. 721,456

3 Claims. (Cl. 260—78.5)

This invention relates to polymeric compounds and relates more particularly to novel polymeric compounds obtained by copolymerizing a mixture of organic compounds containing unsaturated linkages, one of which compounds comprises an ester of an organic acid free of ethylenic double bonds with an unsaturated alcohol containing at least three carbon atoms, and the other the ester of an alpha-unsaturated acid and a saturated monohydric alcohol.

Many monomeric organic compounds having unsaturated linkages in their structure such as, for example, methyl methacrylate, vinyl chloride or vinyl acetate are capable of undergoing rapid polymerization with the formation of high molecular weight polymers of great commercial value. Other organic compounds containing similar unsaturated linkages in their structure but comprising higher homologues are quite difficult to polymerize. Even when employing high reaction temperatures and/or catalyst concentrations, these compounds are found to polymerize only slowly and incompletely and yield low-molecular weight, brittle polymers of little value. As examples of such compounds containing unsaturated linkages which do not undergo satisfactory polymerization, there may be mentioned esters of organic acids free of ethylenic double bonds with unsaturated alcohols having at least three carbon atoms such as allyl acetate or allyl benzoate, or esters of saturated alcohols with alpha-unsaturated acids such as di-ethyl maleate and di-butyl fumarate. Since these unsaturated esters do not polymerize satisfactorily, they have found little or no practical use in the production of polymeric compounds.

It is, therefore, an important object of this invention to provide a process for the production of commercially valuable polymeric compounds by effecting the copolymerization of unsaturated compounds comprising organic acid esters, which compounds by themselves are polymerized only with difficulty, if at all.

Another object of this invention is the production of novel copolymers possessing valuable thermoplastic and thermosetting characteristics and yielding strong, tough products of excellent color.

Other objects of this invention will be apparent from the following detailed description.

As is well known, when esters of an organic acid free of ethylenic double bonds and an unsaturated alcohol having at least three carbon atoms, or certain esters of an alpha-unsaturated acid and a saturated alcohol are polymerized individually, the polymerization is effected only with difficulty and the polymerization products obtained are unsatisfactory from the viewpoints of color and moldability. However, we have found that when such esters are reacted with each other copolymerization takes place rapidly and with relative ease. The polymerization products obtained are strong, tough, high-molecular weight thermoplastic and thermosetting resinous copolymers of good color which are of considerably more value and usefulness than those obtained when said esters are polymerized individually. Furthermore, our novel copolymerization reaction may be effected at lower temperatures and employing lesser amounts of polymerization catalyst than are necessary for polymerizing said esters individually.

Especially valuable copolymers are obtained when one of the esters employed in our novel copolymerization reaction comprises the esterification product of an unsaturated alcohol having at least three carbon atoms with a polycarboxylic acid. This poly-carboxylic acid ester has at least two unsaturated groups capable of polymerization and, when said ester is copolymerized with the ester of a saturated alcohol and an unsaturated acid, in accordance with our process, novel cross-linked, thermosetting copolymers are formed. These co-polymers may be cast or molded in the usual manner into heat-resistant articles, and may also be employed for the preparation of bonding materials or adhesives where thermosetting properties are desirable.

Examples of the unsaturated alcohols containing at least three carbons whose mono-carboxylic or poly-carboxylic acid esters may be copolymerized with the difficultly polymerizable esters of unsaturated mono-carboxylic and poly-carboxylic acids are allyl alcohol, methallyl alcohol, crotyl alcohol, allyl carbinol, methyl vinyl carbinol, etc., while examples of the unsaturated acids whose esters with saturated alcoholic compounds may be employed to effect said copolymerization are acrylic acid, methacrylic acid, itaconic acid, crotonic acid, aconitic acid, maleic acid, fumaric acid, etc. These esters are characterized by the presence of at least one polymerizable group

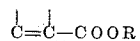

in which R is a radical of a monohydric alcohol. Thus, esters such as allyl formate, allyl acetate, allyl propionate, allyl butyrate, allyl laurate, allyl benzoate, di-allyl phthalate, di-allyl malate, di-allyl tartrate, di-allyl succinate, methallyl formate, methallyl acetate, methallyl propionate, methallyl butyrate, methallyl laurate, methallyl benzoate, di-methallyl phthalate, di-methallyl malate, di-methallyl tartrate, di-methallyl succinate, crotyl formate, crotyl acetate, crotyl propionate, crotyl butyrate, crotyl laurate, crotyl benzoate, di-crotyl phthalate, di-crotyl malate, di-crotyl tartrate, di-crotyl succinate, allyl carbinol formate, allyl carbinol acetate, allyl carbinol propionate, allyl carbinol butyrate, allyl carbinol laurate, allyl carbinol benzoate, di-allyl carbinol phthalate, di-allyl carbinol malate, di-allyl carbinol tartrate, di-allyl carbinol succinate, methyl vinyl carbinol formate, methyl vinyl carbinol acetate, methyl vinyl carbinol propionate, methyl vinyl carbinol butyrate, methyl vinyl carbinol laurate, methyl vinyl carbinol benzoate, di-methyl vinyl carbinol phthalate, di-methyl vinyl carbinol malate, di-methyl vinyl carbinol tartrate, and di-methyl vinyl carbinol succinate yield excellent copolymers when copolymerized with esters such as, for example, methyl acrylate, ethyl acrylate, propyl acrylate, butyl acrylate, octyl acrylate, decyl acrylate, cyclohexyl acrylate, benzyl acrylate, phenyl acrylate, methyl methacrylate, ethyl methacrylate, propyl methacrylate, butyl methacrylate, octyl methacrylate, decyl methacrylate, cyclohexyl methacrylate, benzyl methacrylate, phenyl methacrylate, di-methyl itaconate, di-ethyl itaconate, di-propyl itaconate, di-butyl itaconate, di-octyl itaconate, di-decyl itaconate, di-cyclohexyl itaconate, di-benzyl itaconate, di-phenyl itaconate, methyl crotonate, ethyl crotonate, propyl crotonate, butyl crotonate, octyl crotonate, decyl crotonate, cyclohexyl crotonate, benzyl crotonate, phenyl crotonate, methyl aconitate, ethyl aconitate, propyl aconitate, butyl aconitate, octyl aconitate, decyl aconitate, cyclohexyl aconitate, benzyl aconitate, phenyl aconitate, di-methyl maleate, di-ethyl maleate, di-propyl maleate, di-butyl maleate, di-octyl maleate, di-decyl maleate, di-cyclohexyl maleate, di-benzyl maleate, di-phenyl maleate, di-methyl fumarate, di-ethyl fumarate, di-propyl fumarate, di-butyl fumarate, di-octyl fumarate, di-decyl fumarate, di-cyclohexyl fumarate, di-benzyl fumarate, and di-phenyl fumarate.

The copolymerization may be effected in bulk, in solution, in suspension or in emulsion form by employing suitable emulsifying agents, with or without polymerization catalysts, activators or other agents which affect the rate of the copolymerization reaction. Where catalysts or activators are desirable or essential, catalysts such as oxygen, benzoyl peroxide, hydrogen peroxide or potassium persulfate, and activators, such as, ferric chloride, sodium bisulfate or actinic light may be employed. Usually, the copolymerization reaction may be effected at a satisfactory rate employing reaction temperatures of 30 to 150° C. and a catalyst or activator concentration of 0 to 5% on the weight of the copolymerizing reactants. If desired, plasticizers, dyes, pigments or other effect materials may be added before, during or after the copolymerization reaction to modify the color, plasticity, etc. of the resulting copolymer.

In order further to illustrate our invention, but without being limited thereto, the following examples are given:

Example I 50 parts by volume of allyl acetate are mixed with 50 parts by volume of di-ethyl maleate and about 5% by weight of benzoyl peroxide added thereto. The mixture is heated for 16 hours at 65° C., followed by 72 hours at 80° C. and finally 24 hours at 100° C. A yield of about 75% of a tacky resin is obtained. Control samples of pure allyl acetate and pure di-ethyl maleate are also subjected to the same reaction conditions employing benzoyl peroxide as catalyst. The pure allyl acetate becomes only slightly viscous and the pure di-ethyl maleate undergoes no noticeable polymerization under said reaction conditions as indicated by complete miscibility in petroleum naphtha of the product.

When mixtures of allyl acetate with di-ethyl maleate containing 25% and 75% by volume of allyl acetate, respectively, together with 5% by weight of benzoyl peroxide as copolymerization catalyst, are reacted employing the same heating cycle as above, high yields of tacky resins are again obtained in each instance.

Example II

A mixture of equal parts by weight of allyl benzoate and di-ethyl maleate containing 4% by weight of benzoyl peroxide is heated for 16 hours at 60° C. and 8 days at 80° C. Copolymerization takes place between the allyl benzoate and the di-ethyl maleate, and a soft, solid resin copolymer is formed. Under the same reaction conditions, i. e. 16 hours at 60° C. and 8 days at 80° C. with benzoyl peroxide as catalyst, allyl benzoate alone merely increases somewhat in viscosity while no observable change takes place in a sample of pure di-ethyl maleate.

Example III

A mixture containing 75 parts by weight of allyl formate, 25 parts by weight of methyl acrylate and 3 parts by weight of benzoyl peroxide is heated in a sealed glass tube for 16 hours at 60° C. and 8 days at 80° C. A copolymerization reaction takes place with the formation of an acetone-insoluble, clear, transparent solid mass. When the transparent solid mass is crushed, leached with alcohol and dried, a yield of a solid resin comprising 45% by weight of the original mixture is obtained. When a sample of allyl formate containing 3% by weight of benzoyl peroxide is heated for 16 hours at 60° C. and 8 days at 80° C. no polymerization takes place. Methyl acrylate polymerizes under these reaction conditions to form polymethyl acrylate, but the resin obtained is acetone-soluble. The formation of an acetone-insoluble product when the mixture is subjected to polymerization conditions in accordance with our process and the yield obtained indicates that a copolymerization has taken place between the allyl formate and the methyl acrylate.

Example IV

A mixture of 60% by weight of di-allyl phthalate and 40% by weight of methyl methacrylate. containing 0.5% by weight of benzoyl peroxide is reacted between glass plates for 24 hours at 65° C. The product formed is a clear, colorless, insoluble and infusible copolymer resin having a Rockwell hardness (M scale) of 111 even though as high as 40% methyl methacrylate, which by itself forms a soluble thermoplastic polymer, is employed in the mixture. When di-allyl phthalate alone is polymerized, the addition of 2% by weight of benzoyl peroxide as polymerization catalyst yields a polymer which is light amber in color having a Rockwell hardness of 105 compared with 111 above. Thus, by effecting the copolymerization of the di-allyl phthalate with another polymerizable compound in accordance with our process, less catalyst is necessary to effect the copolymerization than to effect the individual polymerization and the objectionable amber color of the polymerized di-allyl phthalate caused by the use of excessive catalyst is completely eliminated.

*Example V*

Di-allyl phthalate and di-ethyl maleate containing about 2% by weight of benzoyl peroxide are copolymerized in the following proportions by volume, the mixtures being heated for 16 hours at 63° C., followed by 24 hours at 82° C. and finally for 24 hours at 95° C., to effect complete copolymerization.

| Vol. Per Cent Di-allyl Phthalate | Vol. Per Cent Di-ethyl Maleate | Product After Initial Heating at 63° C. | End of Polymerization Cycle | Shore "D" Hardness of Final Product |
|---|---|---|---|---|
| 100 | 0 | fluid | solid | 85 |
| 80 | 20 | viscous | do | 92 |
| 60 | 40 | solid | do | 94 |
| 40 | 60 | do | do | 88 |
| 20 | 80 | fluid | fluid | 0 |
| 0 | 100 | do | do | 0 |

The samples containing 20 to 60 parts by volume of di-ethyl maleate and 80 to 40 parts by volume of di-allyl phthalate, polymerize more rapidly and give harder products than the sample containing di-allyl phthalate alone.

*Example VI*

A mixed neutral butenyl ester obtained by esterifying phthalic anhydride with a mixture of about equal parts of allyl carbinol and crotyl alcohol is copolymerized with different proportions of methyl acrylate in the presence of about 0.2% by weight of benzoyl peroxide. The reaction mixtures are heated first for 16 hours at 60° C., then for 48 hours at 80° C. and finally for 48 hours at 200° C. The following results are obtained:

| Sample | Vol. Per Cent Methyl Acrylate | Vol. Per Cent Butenyl Phthalate | Condition at end of heating cycle |
|---|---|---|---|
| A | 0 | 100 | fluid. |
| B | 20 | 80 | solid. |
| C | 40 | 60 | Do. |
| D | 60 | 40 | Do. |
| E | 80 | 20 | Do. |
| F | 100 | 0 | Do. |

The solid copolymers are rubbery, transparent, colorless solids. Samples of A and F, treated as above, in the proportion of 80:20 form a viscous liquid. On the other hand, the solid body actually obtained in B indicates that the otherwise unreactive butenyl ester has participated to a large extent in the formation of the resinous copolymer.

*Example VII*

Di-allyl phthalate and methyl acrylate are mixed in the proportions set out in the table below. 40 parts by weight of each of the monomer mixtures are added to 80 parts by weight of water containing 0.04 part of potassium persulfate and 0.4 part by weight of "Aerosol OT" (dioctyl ester of sodium sulfo-succinate), the mixtures emulsified and the emulsions heated for 24 hours at 75° C. after which the polymer suspensions are precipitated, washed, dried and molded for hardness tests.

| Weight Per Cent Methyl Acrylate in Monomer Mixture | Weight Per Cent Di-allyl Phthalate in Monomer Mixture | Per Cent Yield of Copolymer After Heating | Shore "D" Hardness |
|---|---|---|---|
| 100 | 0 | 95 | 30 |
| 75 | 25 | 91 | 85 |
| 25 | 75 | 96 | 92 |
| 0 | 100 | 3 | 95 |

It will be noted that di-allyl phthalate alone gives only a very small yield of polymer while the mixtures containing even small amounts of methyl acrylate polymerize almost to completion. The copolymers obtained are superior to polymethyl acrylate both in hardness and in their resistance to heat.

*Example VIII*

A mixture of 0.4 mol of butadiene monoxide, 0.29 mol of succinic anhydride and 0.11 mol of succinic acid are heated under reflux for 7 hours, the final temperature of reflux being 200° C. The product obtained, which may be considered a vinyl glycol succinate, is an acetone-soluble resinous mass. A portion of the resin obtained is heated with an equal weight of methyl acrylate in the presence of 1% by weight of benzoyl peroxide for 3 days at 60° C. and then for 3 days at 85° C. A flexible, transparent, solid mass is obtained which swells in acetone but is not soluble therein. Under the same conditions of catalyst content and reaction temperature, methyl acrylate alone undergoes polymerization to yield an acetone-soluble polymer. The condensation resin itself does not undergo any polymerization at all when subjected to said reaction conditions indicating that the acetone-insoluble resin which forms is a copolymerization product.

The above examples illustrate that by copolymerizing two monomers of the specified type, it is possible to obtain highly desirable results which cannot be obtained by separately polymerizing each monomer under the same conditions of catalysts, time and temperature. Neither the high yields nor the superior physical properties of the copolymers could have been anticipated from the behavior of the constituent monomers themselves.

Where the term "organic acid free of ethylenic double bonds" is employed in the specification and the appended claims, it is to be understood as including not only saturated aliphatic acids but aromatic organic acids as well.

It is to be understood that the foregoing detailed description is given merely by way of illustration and that many variations may be made therein without departing from the spirit of our invention.

Having described our invention, what we desire to secure by Letters Patent is:

1. Process for the production of copolymers, which comprises reacting for about 16 hours at 65° C., followed by 72 hours at 80° C. and finally 24 hours at 100° C., a mixture of 25 to 75 parts of an ester of a monocarboxylic aliphatic organic acid free of ethylenic double bonds and allyl alcohol and 75 to 25 parts of a diester of maleic acid and a saturated monohydric alcohol in the absence of other polymerizable compounds.

2. Process for the production of copolymers, which comprises reacting for about 16 hours at 65° C., followed by 72 hours at 80 C. and finally 24 hours at 100 C., a mixture of 25 to 75 parts of allyl acetate and 75 to 25 parts of diethyl maleate in the absence of other polymerizable compounds.

3. The tacky resin comprising the copolymerization reaction product obtained in accordance with the process of claim 2.

ERNEST PAUL IRANY.
IRVING SKEIST.
VINCENT F. MATURI.

REFERENCES CITED

The following references are of record in the file of this patent:

UNITED STATES PATENTS

| Number | Name | Date |
|---|---|---|
| 2,202,846 | Garvey et al. | June 4, 1940 |
| 2,218,439 | Rothrock | Oct. 15, 1940 |
| 2,273,891 | Pollack et al. | Feb. 24, 1942 |
| 2,332,900 | D'Alelio | Oct. 26, 1943 |
| 2,419,221 | Kenyon et al. | Apr. 22, 1947 |
| 2,426,402 | Magrane | Aug. 26, 1947 |
| 2,431,374 | D'Alelio | Nov. 25, 1947 |
| 2,448,531 | Kenyon et al. | Sept. 7, 1948 |
| 2,449,804 | D'Alelio et al. | Sept. 21, 1948 |
| 2,461,301 | Tawney | Feb. 8, 1949 |